United States Patent Office 3,143,407
Patented Aug. 4, 1964

3,143,407
COMPOSITION FOR CONTROL OF VEGETATION
Ellen M. Mitchell, Long Beach, Paul E. Giguere, La Mirada, and Dale W. Rake, Yorba Linda, Calif., assignors to United States Borax & Chemical Corporation, Los Angeles, Calif., a corporation of Nevada
No Drawing. Continuation of abandoned application Ser. No. 738,296, May 28, 1958. This application Mar. 2, 1959, Ser. No. 796,214
5 Claims. (Cl. 71—2.4)

The present invention is a continuation of our invention Serial No. 738,296, filed May 28, 1958, now abandoned.

This invention relates to herbicidal compositions for controlling vegetation and has more particular reference to improved chemical compositions and methods for killing weeds and control weed growth.

In the present invention the term "weeds" is used in its broadest sense and is meant to include all vegetation which grows in areas where it is not wanted. The term "vegetation" is meant to include plants in all stages of development from the germinating seed to full-grown plants, whether annual, biennial or perennial in growth habit.

It is, therefore, the principal object of the present invention to provide chemical compositions for controlling or eliminating weeds, which compositions are more resistant to breakdown by soil organisms and degeneration due to climatic conditions and virtually more persistent in herbicidal activity.

A further object is to provide herbicidal compositions having phytotoxicity unattained by prior art compositions.

Other objects will become apparent as the description proceeds.

To the accomplishment of the foregoing and related ends, the invention then comprises the features hereinafter fully described and particularly pointed out in the claims, the following description setting forth in detail certain illustrative embodiments of the invention, these being indicative, however, of but a few of the ways in which the principle of the invention may be employed.

The present invention is predicated upon the discovery that when certain herbicidal chemicals are dispersed in a stable thixotropic colloidal gel a synergistic effect is obtained which results in phytotoxicity never before obtained by these ingredients alone.

We have found that when such a composition is applied to vegetation it forms a thin durable film which is held in intimate contact with the outer surfaces or epidermal cells of both monocotyledonous and dicotyledonous plants. If the herbicides which are suspended in the colloid are relatively water insoluble or slowly soluble the film holding the herbicides in close contact with the epidermal cells of the plant is returned to its gel-like or thixotropic state by water of transpiration or plant exudate, thus allowing small quantities of the herbicide to be dissolved. The dissolved portion of the herbicides enter the plant through the epidermal cells or stomata and then into the translocation system to produce internal toxic symptoms. Should the herbicides suspended in the colloid be water soluble the film holding the herbicide in tight contact with the plant allows a quick "burn" action.

If sodium borate and sodium chlorate are combined with an organic herbicide in an aqueous thixotropic colloidal gel an effect is produced which gives a quick "burn" along with sustained herbicidal action. We do not know what causes the synergistic effect, but the fact remains that if the foregoing combined herbicides or other combination of herbicides are applied to a plant in water solution or as a dust, etc., without being suspended in the thixotropic colloid, the overall herbicidal effect is markedly less. Still further we have found that small percentages of organic nonionic surface active agents when added to the present compositions greatly improve the contact action of the compositions, especially when used in the control of monocotyledonous type weeds. Additionally the present compositions when applied to the soil surrounding the noxious vegetation will render the soil unproductive and prevent further growth.

It is also of interest to note that the compositions of the present invention do not cause injury to vegetation adjacent to the treated area.

Prior art herbicides which are applied in powders or solutions tend to wash into adjacent areas and cause damage; or they volatilize and the vapors carry over into adjacent areas. However, with the present compositions the colloid holds the herbicide at the point where it is applied.

The following lists of herbicides are illustrative of materials especially useful in the present invention.

I. Sodium and calcium borates:
   (1) Sodium tetraborate decahydrate $Na_2B_4O_7 \cdot 10H_2O$ (borax).
   (2) Anhydrous borax $Na_2B_4O_7$.
   (3) Sodium tetraborate pentahydrate $Na_2B_4O_7 \cdot 5H_2O$.
   (4) Sodium metaborate $Na_2B_2O_4 \cdot 8H_2O$.
   (5) Sodium pentaborate $Na_2B_{10}O_{16} \cdot 10H_2O$.
   (6) Gerstley borate—a natural occurring mixture of ulexite ($NaCaB_5O_9 \cdot 8H_2O$) and colemanite ($Ca_2B_6O_{11} \cdot 5H_2O$).
   (7) Colemanite—a natural occurring calcium borate $Ca_2B_6O_{11} \cdot 5H_2O$.
   (8) Ulexite—a natural occurring sodium-calcium borate ($NaCaB_5O_9 \cdot 8H_2O$).

As indicated, these borates may be used with or without their normal water of hydration. Polyborates made up of mixtures of borates and mixtures of borates with boric acid may also be used.

In the preferred embodiment of our invention we use a borate or combination of borates which in solution produce a pH of about 11.0–12.0. An example of such a borate is anhydrous sodium metaborate ($Na_2B_2O_4$). If desired various borates can be used in combination with an alkali metal hydroxide, such as sodium hydroxide, to bring the pH up to the preferred level.

II. Alkali and alkaline earth chlorates:
   (1) Sodium chlorate.
   (2) Potassium chlorate.
   (3) Lithium chlorate.
   (4) Calcium chlorate.

In the preferred embodiment of our invention we use sodium chlorate since it is the cheapest and most readily obtainable.

III. Water insoluble organic herbicides:
   (1) 2,4-dichlorophneoxyacetic acid.
   (2) 2,4,5-trichlorophenoxyacetic acid.
   (3) 2-methyl-4-chlorophenoxyacetic acid.
   (4) 2-chloro-4,6-bis(ethylamino)-S-triazine.
   (5) 3-(p-chlorophenyl)-1,1-dimethyl urea.
   (6) 3-phenyl-1,1-dimethyl urea.
   (7) 3-(3,4-dichlorophenyl)-1,1-dimethyl urea.
   (8) 3-(3,4-dichlorophenyl)-1 methyl-1-n-butyl urea.
   (9) 2 chloro-4,6-bis(diethylamino)-S-triazine.
   (10) 2,3,6-trichlorobenzoic acid.
   (11) Isopropyl-N-(3-chlorophenyl) carbamate.

IV. Water soluble organic herbicides:
   (1) Sodium salt of 2,4-dichlorophenoxyacetic acid.
   (2) Sodium 2-(2,4-dichlorophenoxy)ethyl sulfate.

(3) 2,2-dichloropropionic acid.
(4) Sodium 2,4,5-trichlorophenoxyethyl sulfate.
(5) Trichloroacetic acid.
(6) 3-amino-1,2,4 triazole.
(7) Sodium salt pentachlorophenate.

It is to be understood that those organic materials accepted by those skilled in the art as herbicides are all useful in the present invention.

As previously stated, the foregoing herbicidal materials are dissolved and/or dispersed in a thixotropic colloidal gel. The following suspending agents are illustrative of materials useful in preparing these gels:

(1) Carboxymethylcellulose.
(2) Hydrous magnesium silicate.
(3) Casein.
(4) Gum arabic.
(5) Guar gum.
(6) Alginates.
(7) Methyl cellulose.
(8) Clays.

In the preferred embodiment of our invention we use the high-swelling clays which are known as bentonite clays.

Nonionic surface active agents, such as the following, are typical of those useful in the present invention:

(1) Emcol 14 (polyglyceride ester of fatty acid).
(2) Triton B–1956 (phthalic glycerol alkyl resin).
(3) Triton X–100 (alkyl aryl polyether alcohol).
(4) Permelene (fatty esters and salts of fatty alcohol sulfates).
(5) Nonionic #218 (polyethylene glycol tetradodecyl thioether).
(6) Sterox CD (polyoxyethylene thioether).

While the aforegoing comprise only several examples of nonionic surface active agents, there are a great number of other nonionic surface active agents well known to those skilled in the art which are also applicable to the present invention.

In practical application of this invention herbicidal formulations composed of at least one material from each group may be so selected as to comprise the following composition:

| | Parts by wt. |
|---|---|
| (1) Sodium and/or calcium borates | 3.0–32.0 |
| (2) Alkali metal or alkaline earth metal chlorate | 1.0–16.0 |
| (3) Water soluble or water insoluble organic herbicide | 0.04–20.0 |
| (4) Suspending agent | 0.25–25.0 |
| (5) Organic nonionic surface active agent | 0–1.0 |
| (6) Alkali metal hydroxide | 0–7.0 |
| (7) Water | 50.0–94.0 |

The ingredients used to produce the preferred embodiment of our invention may be so selected as to comprise the following composition:

| | Parts by wt. |
|---|---|
| (1) Anhydrous sodium metaborate | 9.0–11.0 |
| (2) Sodium chlorate | 3.0–5.0 |
| (3) Water soluble or water insoluble organic herbicide | 0.3–2.0 |
| (4) Bentonite clay | 2.0–4.0 |
| (5) Nonionic surface active agent | 0.2–0.5 |
| (6) Water | 50.0–92.0 |

In producing the compositions of our invention we have found that the most stable colloids are produced by first completely hydrating the suspending agent then adding the other ingredients to the suspension. For example, bentonite clay is added to the predetermined amount of water using a high-speed mixing device. The bentonite clays can absorb up to ten times their weight of water, and this proportion of clay to water will be found generally to be the most expedient proportions to use. After all the clay (or other suspending agent) has been added to the water, time is allowed (usually up to about 30 minutes) for complete hydration before the remaining ingredients are added. It is immaterial whether the suspending agent is added to the other ingredients or vice versa, as long as good mixing techniques are used.

By first substantially completely hydrating the suspending agent and then adding the other ingredients, we are able to produce herbicidal compositions which not only give a faster "burn" and a longer contact action, but we also have been able to produce herbicidal compositions which are substantially stable colloidal suspensions in a temperature range of from about 0°–50° C.

So that the present invention is more clearly understood the following examples are given:

I

| | Parts by wt. |
|---|---|
| (1) Anhydrous sodium metaborate | 9.0–11.0 |
| (2) Sodium chlorate | 2.0–5.0 |
| (3) Sodium salt of 2,4-dichlorophenoxyacetic acid | 0.1–4.0 |
| (4) Nonionic surface active agent (Emcol 14) | 0.2–0.5 |
| (5) Bentonite clay | 0.5–4.0 |
| (6) Water | 50.0–90.0 |

II

| | |
|---|---|
| (1) Anhydrous sodium metaborate | 9.0–11.0 |
| (2) Sodium chlorate | 2.0–5.0 |
| (3) Pentachlorophenate (sodium salt) | 2.0–5.0 |
| (4) Bentonite clay | 0.5–4.0 |
| (5) Nonionic surface active agent (Triton B–1956) | 0.2–0.5 |
| (6) Water | 50.0–90.0 |

III

| | |
|---|---|
| (1) Anhydrous calcium borate | 9.0–11.0 |
| (2) Potassium chlorate | 2.0–5.0 |
| (3) Trichloroacetic acid | 2.0–5.0 |
| (4) Methyl cellulose | 0.5–4.0 |
| (5) Nonionic surface active agent (nonionic #218) | 0.2–0.5 |
| (6) Water | 50.0–90.0 |

IV

| | Percent |
|---|---|
| (1) Sodium hydroxide | 4.00 |
| (2) Sodium tetraborate pentahydrate | 10.80 |
| (3) Sodium chlorate | 3.80 |
| (4) Bentonite clay | 2.40 |
| (5) 3-p-chlorophenyl-1,1-dimethyl urea | 0.42 |
| (6) Nonionic surface active agent (Emcol 14) | 0.25 |
| (7) Water | 78.33 |

The sodium hydroxide, sodium tetraborate pentahydrate and sodium chlorate were dissolved in 60–75% of the total water. The remaining 25–40% water was used to hydrate the suspending agent. The clay was added to the water with agitation and allowed to stand about 30 minutes. The organic herbicide and wetting agent were then added to the colloid with agitation and then the colloid was added to the borate, caustic and chlorate solution. The resulting mixture was a stable thixotropic colloidal gel.

Using substantially the same technique as in Example IV, the compositions of the following examples were prepared:

V

| | Percent |
|---|---|
| (1) Sodium hydroxide | 4.00 |
| (2) Sodium tetraborate decahydrate | 15.85 |
| (3) Sodium chlorate | 3.80 |
| (4) Bentonite clay | 2.40 |
| (5) 3-p-chlorophenyl-1,1-dimethyl urea | 0.42 |
| (6) Nonionic surface active agent (Triton B–1956) | 0.25 |
| (7) Water | 73.28 |

VI (1) Anhydrous sodium metaborate _____ 10.80
(2) Sodium chlorate _____ 3.80
(3) Bentonite clay _____ 2.40
(4) 3-p-chlorophenyl-1,1-dimethyl urea ____ 0.42
(5) Nonionic surface active agent (Emcol 14) ___ 0.25
(6) Water _____ 82.33

VII (1) Anhydrous sodium metaborate _____ 10.80
(2) Sodium chlorate _____ 3.80
(3) Hydrous magnesium silicate _____ 2.00
(4) 2-chloro-4,6-bis-ethylamino-S-triazine __ 0.40
(5) Nonionic surface active agent (Triton X-100) ___ 0.20
(6) Water _____ 82.80

VIII (1) Anhydrous sodium metaborate _____ 10.80
(2) Sodium chlorate _____ 3.80
(3) Carboxymethylcellulose _____ 1.00
(4) 2,4-dichlorophenoxyacetic acid _____ 0.33
(5) Nonionic surface active agent (Sterox CD) __ 0.25
(6) Water _____ 83.82

The compositions of the foregoing examples and variations thereof were applied directly to vegetation or as a soil treatment, at rates of 150 to 300 gallons per acre. The present compositions showed superior phytotoxicity to any of the components applied singly or combined in dry admixture or solution when applied to the same rates of application.

Other modes of applying the principle of the invention may be employed, change being made as regards the details described, provided the features stated in any of the following claims or the equivalent of such be employed.

We, therefore, particularly point out and distinctly claim as our invention:

1. A composition for control of vegetation capable when applied in one application of imparting a quick burn along with a prolonged herbicidal action, said composition comprising as the essential active ingredients a herbicidal concentration of a material selected from the group consisting of sodium and calcium borates, an alkali metal chlorate and an organic herbicide dispersed in a thixotropic gel, said organic herbicide selected from the group consisting of 2,4-dichlorophenoxyacetic acid, 2,4,5-trichlorophenoxyacetic acid, 2-methyl-4-chlorophenoxyacetic acid, 2-chloro-4,6-bis(ethylamino)-S-triazine, 3-(p-chlorophenyl)-1,1-dimethyl urea, 3-phenyl-1,1-dimethyl urea, 3-(3,4-dichlorophenyl)-1,1-dimethyl urea, 3-(3,4-dichlorophenyl)-1-methyl-1-n-butyl urea, 2-chloro-4,6-bis-(diethylamino)-S-triazine, 2,3,6-trichlorobenzoic acid, isopropyl-N-(3-chlorophenyl) carbamate, sodium salt of 2,4-dichlorophenoxyacetic acid, sodium 2-(2,4-dichlorophenoxy)ethyl sulfate, 2,2-dichloropropionic acid, sodium 2,4,5-trichlorophenoxyethyl sulfate, trichloroacetic acid, 3-amino-1,2,4-triazole, and sodium salt pentachlorophenate, said gel comprising an aqueous colloidal suspension of a material selected from the class consisting of clays, methyl cellulose, alginates, guar gums, gum arabic, casein, hydrous magnesium silicate, and carboxymethylcellulose.

2. A composition for control of vegetation capable when applied in one application of imparting a quick burn along with a prolonged herbicidal action, said composition comprising as the essential active ingredients from about 3.0 to about 32.0 parts by weight of a material selected from the group consisting of sodium and calcium borates, from about 1.0 to about 16.0 parts by weight of an alkali metal chlorate, from about 0.04 to about 4.0 parts by weight of an organic herbicide, said herbicide selected from the group consisting of 2,4-dichlorophenoxyacetic acid, 2,4,5-trichlorophenoxyacetic acid, 2-methyl-4-chlorophenoxyacetic acid, 2-chloro-4,6-bis(ethylamino)-S-triazine, 3-(p-chlorophenyl)-1,1-dimethyl urea, 3-phenyl-1,1-dimethyl urea, 3-(3,4-dichlorophenyl)-1,1-dimethyl urea, 3-(3,4-dichlorophenyl)-1-methyl-1-n-butyl urea, 2-chloro-4,6-bis(diethylamino)-S-triazine, 2,3,6-trichlorobenzoic acid, isopropyl-N-(3-chlorophenyl) carbamate, sodium salt of 2,4-dichlorophenoxyacetic acid, sodium 2-(2,4-dichlorophenoxy)ethyl sulfate, 2,2-dichloropropionic acid, sodium 2,4,5-trichlorophenoxyethyl sulfate, trichloroacetic acid, 3-amino-1,2,4-triazole, and sodium salt pentachlorophenate, from about 0 to about 1 part by weight of an organic nonionic surface active agent, and from 0 to about 7.0 parts by weight of an alkali metal hydroxide dispersed in a thixotropic gel, said gel comprising an aqueous colloidal suspension from about 1.0 to about 25.0 parts by weight of a material selected from the group consisting of clays, methyl cellulose, alginates, guar gums, gum arabic, casein, hydrous magnesium silicate, and carboxymethylcellulose, said total composition containing from about 50.0 to about 92.0 parts by weight of water.

3. A composition for control of vegetation capable when applied in one application of imparting a quick burn along with a prolonged herbicidal action, said composition comprising as the essential active ingredients from about 9.0 to about 11.0 parts by weight of sodium metaborate, from about 3.0 to about 5.0 parts by weight of sodium chlorate, from about 0.04 to about 4.0 parts by weight of an organic herbicide, said herbicide selected from the group consisting of 2,4-dichlorophenoxyacetic acid, 2,4,5-trichlorophenoxyacetic acid, 2-methyl-4-chlorophenoxyacetic acid, 2-chloro-4,6-bis(ethylamino)-S-triazine, 3-(p-chlorophenyl)-1,1-dimethyl urea, 3-phenyl-1,1-dimethyl urea, 3-(3,4-dichlorophenyl)-1,1-dimethyl urea, 3-(3,4-dichlorophenyl)-1-methyl-1-n-butyl urea, 2-chloro-4,6-bis(diethylamino)-S-triazine, 2,3,6-trichlorobenzoic acid, isopropyl-N-(3-chlorophenyl) carbamate, sodium salt of 2,4-dichlorophenoxyacetic acid, sodium 2-(2,4-dichlorophenoxy)ethyl sulfate, 2,2-dichloropropionic acid, sodium 2,4,5-trichlorophenoxyethyl sulfate, trichloroacetic acid, 3-amino-1,2,4-triazole, and sodium salt pentachlorophenate, and from about 0.2 to about 0.5 part by weight of an organic nonionic surface active agent dispersed in a thixotropic gel, said gel comprising an aqueous colloidal suspension of from about 0.5 to about 4.0 parts by weight of bentonite clay, said total composition containing about 50.0 to about 92.0 parts by weight of water.

4. The method of controlling vegetation which comprises applying thereto in herbicidal quantities a composition comprising as the essential active ingredients from about 3 to about 32 parts by weight of a material selected from the group consisting of sodium and calcium borates, from about 1 to about 16 parts by weight of an alkali metal chlorate, from about 0.04 to about 4 parts by weight of an organic herbicide, said organic herbicide selected from the group consisting of 2,4-dichlorophenoxyacetic acid, 2,4,5-trichlorophenoxyacetic acid, 2-methyl-4-chlorophenoxyacetic acid, 2-chloro-4,6-bis(ethylamino)-S-triazine, 3-(p-chloro-phenyl)-1,1-dimethyl urea, 3-phenyl-1,1-dimethyl urea, 3-(3,4-dichlorophenyl)-1,1-dimethyl urea, 3-(3,4-dichlorophenyl)-1-methyl-1-n-butyl urea, 2-chloro-4,6-bis(diethylamino)-S-triazine, 2,3,6-trichlorobenzoic acid, isopropyl-N-(3-chlorophenyl) carbamate, sodium salt of 2,4-dichlorophenoxyacetic acid, sodium 2-(2,4-dichlorophenoxy)ethyl sulfate, 2,2-dichloropropionic acid, sodium 2,4,5-trichlorophenoxyethyl sulfate, trichloroacetic acid, 3-amino-1,2,4-triazole, and sodium salt pentachlorophenate, from about 0 to about 1 part by weight of an organic nonionic surface active agent, and from 0 to about 7 parts by weight of an alkali metal hydroxide dispersed in a thixotropic gel, said gel comprising an aqueous colloidal suspension from about 1 to about 25 parts by weight of a material selected from the group consisting of clays, methyl cellulose, alginates, guar gums, gum arabic, casein, hydrous magnesium silicate and carboxymethylcellulose, said total composition containing from about 50 to about 92 parts by weight of water.

5. The method of sterilizing soil which comprises applying thereto at rates of from about 150 to about 300 gallons per acre of a composition comprising as the essential active ingredients from about 3 to about 32 parts by weight of a material selected from the group consisting of sodium and calcium borates, from about 1 to about 16 parts by weight of an alkali metal chlorate, from about 0.04 to about 4 parts by weight of an organic herbicide, said organic herbicide selected from the group consisting of 2,4-dichlorophenoxy-acetic acid, 2,4,5-trichlorophenoxyacetic acid, 2-methyl-4-chlorophenoxyacetic acid, 2-chloro-4,6-bis(ethylamino)-S-triazine, 3-(p-chlorophenyl)-1,1-dimethyl urea, 3-phenyl-1,1,-dimethyl urea, 3-(3,4-dichlorophenyl)-1,1-dimethyl urea, 3-(3,4-dichlorophenyl)-1-methyl-1-n-butyl urea, 2-chloro-4,6-bis-(diethylamino)-S-triazine, 2,3,6-trichlorobenzoic acid, isopropyl-N-(3-chlorophenyl) carbamate, sodium salt of 2,4-dichlorophenoxyacetic acid, sodium 2-(2,4-dichlorophenoxy)ethyl sulfate, 2,2-dichloropropionic acid, sodium 2,4,5-trichlorophenoxyethyl sulfate, trichloracetic acid, 3-amino-1,2,4-triazole, and sodium salt pentachlorophenate, from about 0 to about 1 part by weight of an organic nonionic surface active agent, and from 0 to about 7 parts by weight of an alkali metal hydroxide dispersed in a thixotropic gel, said gel comprising an aqueous colloidal suspension from about 1 to about 25 parts by weight of a material selected from the group consisting of clays, methyl cellulose, alginates, guar gums, gum arabic, casein, hydrous magnesium silicate and carboxymethylcellulose, said total composition containing from about 50 to about 92 parts by weight of water.

References Cited in the file of this patent

UNITED STATES PATENTS

| | | |
|---|---|---|
| 2,089,612 | Kubelka | Aug. 10, 1937 |
| 2,370,349 | Hance | Feb. 27, 1945 |
| 2,523,316 | McClenahan et al. | Sept. 26, 1950 |
| 2,599,373 | Chrzanowski | June 3, 1952 |
| 2,672,449 | Snell et al. | Mar. 16, 1954 |
| 2,726,150 | Wolter | Dec. 6, 1955 |
| 2,773,757 | Connell et al. | Dec. 11, 1956 |
| 2,847,293 | Harris et al. | Aug. 12, 1958 |
| 2,904,423 | Stone et al. | Sept. 15, 1959 |

FOREIGN PATENTS

| | | |
|---|---|---|
| 203,557 | Australia | May 19, 1955 |
| 727,399 | Great Britain | Mar. 30, 1955 |